United States Patent [19]

Gilmore

[11] 4,345,633
[45] Aug. 24, 1982

[54] WEBBED NON-PNEUMATIC TIRE

[76] Inventor: Oscar P. Gilmore, 5909 Jurupa Ave., Riverside, Calif. 92504

[21] Appl. No.: 8,867

[22] Filed: Feb. 2, 1979

Related U.S. Application Data

[63] Continuation-in-part of Ser. No. 911,204, May 31, 1978, and a continuation-in-part of Ser. No. 919,726, Jun. 27, 1978, abandoned.

[51] Int. Cl.³ ............................................... B60C 7/12
[52] U.S. Cl. .................................................... 152/328
[58] Field of Search ................................ 152/323–325, 152/327–328

[56] References Cited

U.S. PATENT DOCUMENTS

| | | | |
|---|---|---|---|
| 1,417,051 | 5/1922 | Freelander et al. | 152/328 |
| 1,472,903 | 11/1923 | Davis | 152/328 X |
| 1,536,023 | 4/1925 | Kuhn | 152/327 X |
| 1,928,524 | 9/1933 | Brunswick | 152/328 X |
| 2,185,398 | 1/1940 | Brunswick | 152/153 |
| 2,393,161 | 1/1946 | Haushalter | 152/325 |
| 3,980,606 | 9/1976 | Werner | 260/31.8 R |
| 4,071,070 | 1/1978 | Schmidt | 152/328 X |

FOREIGN PATENT DOCUMENTS

368562  3/1932  United Kingdom ................ 152/328

*Primary Examiner*—Charles A. Marmor

*Attorney, Agent, or Firm*—Fulwider, Patton, Rieber, Lee & Utecht

[57] ABSTRACT

A non-pneumatic tire for mounting on a rim having axially spaced annular mounting flanges. The tire is formed with a radially exterior tread surface having axially outwardly sloped side walls projecting radially inwardly therefrom and formed on their radially inwardly extremities with shoulders that nest against the radially outward edges of the mounting flanges. Retaining flanges then project radially inwardly therefrom for retention on the axially inner sides of the mounting flanges. The tread surface and opposite side walls cooperate to form a circumferential interior cavity which a latticework of webbing formed by axially extending interrupter webs which are spaced equidistance about such cavity and have an annular projecting circumferentially thereabout and connected with such axially projecting interrupter webs. The tread, sidewalls, flanges and webbing are all preferably constructed of resilient elastic material such as polyurethane and has a circumferential length approximately 10% less than the circumferential distance around the rim to thus provide an elastic constraining force after being stretched over the rim. Also, elastic endless belts or beads may be embedded in the retaining flanges to provide further securing force maintaining the tire on such rim.

7 Claims, 9 Drawing Figures

FIG. 3
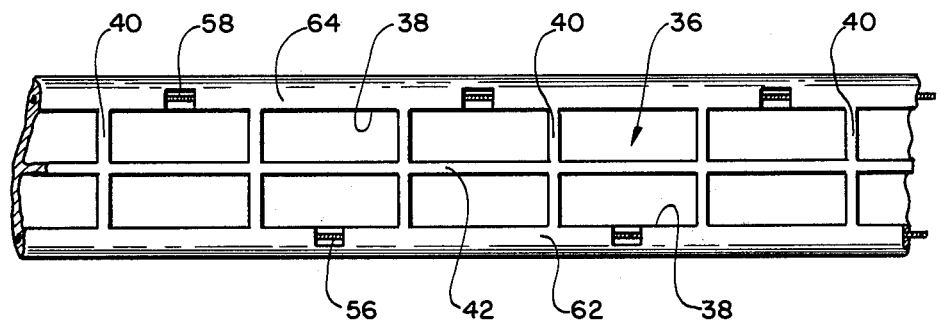
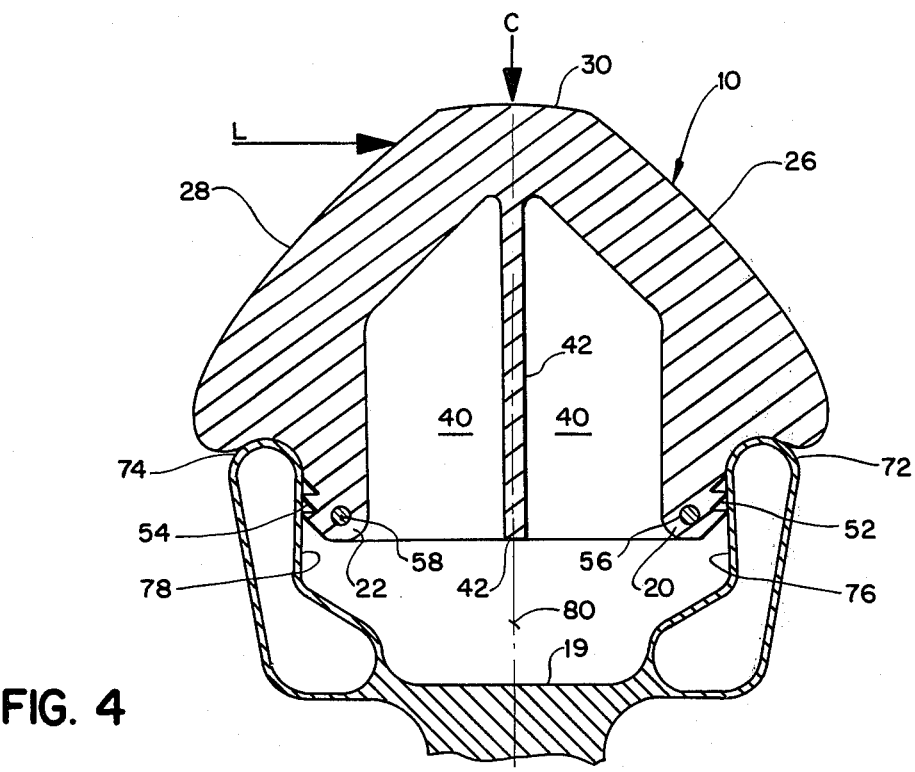
FIG. 4
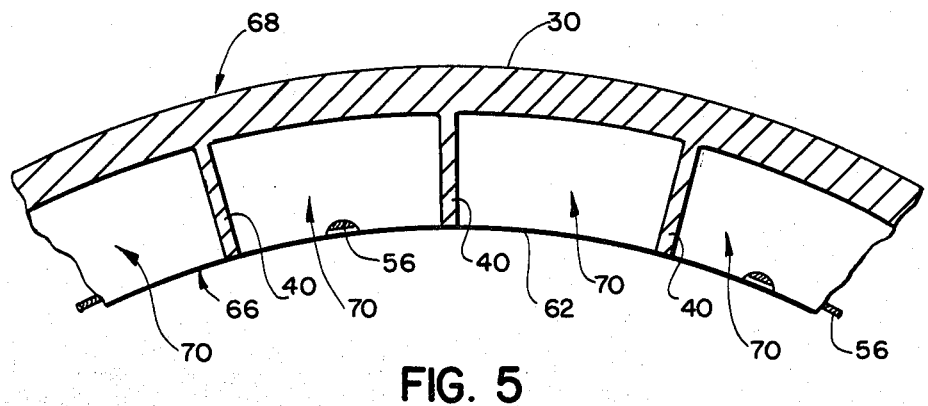
FIG. 5

WEBBED NON-PNEUMATIC TIRE

CROSS REFERENCE TO RELATED APPLICATIONS

This application is a CIP of U.S. Applications Ser. No. 911,204, filed May 31, 1978, and Ser. No. 919,726, filed June 27, 1978 now abandoned.

BACKGROUND OF THE INVENTION

1. Field of the Invention

The present invention relates generally to tires and more particularly to uninflated tires mounted on conventional pneumatic rims.

2. Description of the Prior Art

Numerous attempts have been made to construct a satisfactory non-pneumatic tire, but, in spite of such efforts extending over many decades, there still exists a need for a non-pneumatic tire having the performance characteristics normally associated with pneumatic tires.

Early tires merely provided a coating of rubber on a rigid wood or metal wheel. Subsequent efforts led to resiliant walled tires, not unlike pneumatic tires, wherein the walls had greater rigidity and structural supportive characteristics than that for pneumatic tires. Such tires had the shortcoming that they could not provide the desired weight support function while providing the necessary cushioning for the load being carried thereby.

Other efforts led to the provision of flexible walled tires having a central circumferential cavity filled with resiliant foam or other cellular structure. These tires, likewise, met with dissatisfaction in that the foam or cellular structure frequently tended to break down after a relatively short service life, and in addition, extreme difficulty was encountered with respect to retaining the tires on the rims.

My patent application Ser. No. 911,204, filed May 31, 1978, is directed to a solid cross section tire of resiliant non-cellular material but, again, difficulties have been encountered in retaining such tires on the rim. My application Ser. No. 919,726, filed June 27, 1978, is directed to a flexible wall tire having an interior circumferential cavity extending thereabout with the cross sectional configuration of the walls of such tires being somewhat V-shaped with the apex thereof riding on the ground to provide somewhat of a bridge characteristic in transmitting the force on the tire rim to the tread surface making contact with the ground. A particular shortcoming experienced in testing tires of this construction, revealed that uninflated flexible wall tires of this type tend to build up somewhat of a bulge or wave immediately ahead of the point where the tire makes contact with the ground. This phenomenon, which may be referred to as a "standing wave", is the source of one of the major difficulties experienced in such tests. This may result in the tire crawling, or walking, around the rim at a rate proportional to the speed of rotation and load thereon. The so called standing wave immediately ahead of the ground contact point, or "footprint" of the tire results in the tire attempting to climb such standing wave and encountering rolling resistance. Further, the bulge tends to force the tire away from the rim on which it is mounted and such tendency is compounded when torque is applied to the wheel. When torque is applied to the loaded rim the bulge on the backside of the footprint is exaggerated frequently resulting in a gap opening up between the tire and rim and sometimes results in the tire itself dismounting the rim when lateral forces are applied between such tire and rim, as for instance during a turn of the front wheel or similar maneuver.

Efforts to solve this problem have led to testing various bonding materials for bonding the wall of the tire directly to the rim but with the present state of the art, no such practical bonding materials have been found and even if such material were available, it would suffer the shortcoming that the aforementioned standing wave would still be developed to some degree and the absolute anchoring of the radially inner edges of the tire sidewalls to the rim to positively prevent shifting thereof would result in extreme sheer stresses being applied to such tire as a result of such standing wave, thus rapidly fatiguing and deteriorating the tire itself.

Thus, there still exists a great demand for a non-pneumatic tire which may be easily and conveniently removably mounted on a conventional rim and which will provide the desired weight carrying function and cushioning during operation without building up a role resisting standing wave ahead of the tire footprint and which will avoid accidental dismounting of the tire from the rim during operation thereof.

SUMMARY OF THE INVENTION

The present invention is characterized by a tire formed with a radially outwardly facing tread surface and having radially inwardly and outwardly angled oppositely disposed side walls which engage the tire rim on the radially inward extremities thereof and is formed with radially inwardly extending retaining flanges received on the axially inner side of the rim mounting flanges, the space between the side walls forming an interior cavity. Formed within such interior cavity, is an array of webbing formed with axially extending interrupter webs which maintain the retaining flanges and side walls urged axially outwardly to prevent disengagement of the retaining flanges from the rim mounting flanges while providing a degree of flexing of such side walls and tread as each individual web passes between the rim and entire support surface. Such interrupter webs serve the further function of interrupting this tendency of the tire to build up a standing wave as the weighted rim and tire rotate over a support surface.

The tire may also incorporate an endless annular elastic band extending about such circumferential cavity and connected with each of the axially extending webs to support such webs against buckling as the side walls and retaining flanges are urged axially inwardly thereagainst as they perform their weight support function. Also, endless elastic belts may be embedded in the retaining flanges to cooperate with such flanges and the side walls in resisting radially outwardly expansion of the tire during high speed operation and resultant disengagement of the tire from the rim.

BRIEF DESCRIPTION OF THE DRAWINGS

FIG. 3 is a partial interior view looking radially outwardly from the bottom of the section of tire shown in FIG. 2;

FIG. 4 is a sectional view, taken through a modification of the tire shown in FIG. 1;

FIG. 5 is a radial sectional view taken along the line 5—5 of FIG. 2;

DETAILED DESCRIPTION OF THE PREFERRED EMBODIMENTS

Figure 1:
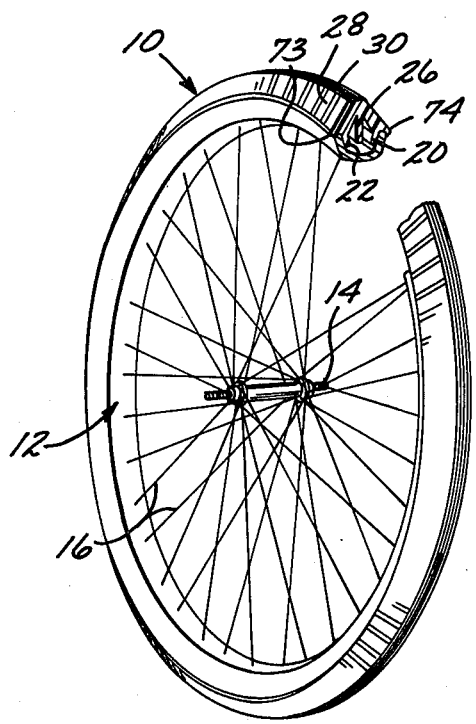
FIG. 1 is a partial cut away perspective view of a tire of the present invention mounted on a rim.

The non-pneumatic tire 10 (FIG. 1) of the present invention is intended to be mounted on a wheel, such as a conventional bicycle wheel 12, which may have a central hub 14 carried central from such wheel by means of bicycle spokes 16. Referring to FIG. 2, the tire 10 includes, generally, a radially outer tread wall 68 having a radially outwardly facing tread surface 30 and angles axially outwardly in opposite directions and radially inwardly to form oppositely angling side walls 26 and 28 which then turn to project radially inwardly to terminate in oppositely disposed retaining flanges 20 and 22. The tread wall 68, opposite side walls 26 and 28, and retaining flanges 20 and 22 cooperate to form a circumferential cavity 36 which is separated into discrete segments by means of resilient radially extending interrupter webs 40 which are circumferentially spaced equidistance about such cavity 36 to be disposed in spaced apart axial planes and cooperate with a central radially projecting elastice support band 42. The tire 10 is preferrably constructed of an elastomer such as polyurethane, or any other natural plastic resiliant material and, in its unstressed condition the tire diameter is considerably less than that of the rim 12 such that the tire itself and support web 42 will be maintained in a stretched condition on such rim to provide structural integrity to the tire and maintain it on such rim. Preferrably elastic nylon belts or beads 56 and 58 are embedded in the retaining flanges 20 and 22 to provide retaining forces for retaining such tire on the rim 12.

While the tire 10 may take many different configurations, it is important that it be hollow to form the circumferential cavity 36 and that the webs 40 be spaced equidistance about such cavity and connect on their axial opposite ends with the retaining flanges 20 and 22 and with the side walls 26 and 28 to restrict against collapse thereof when weight is applied to the rim 12. The elastic annular band 42 is conveniently joined on its radially outer extremity with the tread wall 68 and projects radially inwardly to the annular plane of the radially inner edges of the webs 40.

Referring to FIG. 2, the exterior surfaces of the side walls 26 and 28 slope axially outwardly radially inwardly and at their radially inner extremities, turn axially inwardly to form ears or lobes 41 and 43, respectively and then cup radially inwardly to form radially inwardly opening nesting shoulders 45 and 47, which nest against the rounded radially outward extremities of the respective opposite rim flanges 73 and 74 (FIG. 1), of the rim 12.

Still referring to FIG. 2, the interior cavity 36 is formed in its radially outward extremity with opposite outer surfaces 44 and 46 which angle axially outwardly and radially inwardly to then turn and extend generally radially inwardly to form oppositely disposed side surfaces 48 and 50 defining the interior surfaces of the portion of the side walls 26 and 28 and also of the retaining flanges 22. With continued reference to FIG. 2, in the particular molding procedure employed for molding the tire 10, stand-off supports are employed for supporting the elastic beads 56 and 58 in the mold thus leaving windows 60 in the radially inner edges 62 and 64 of the retaining flanges 20 and 22 which expose the elastic beads 56 and 58. It has been found that, for polyurethane, a circumference for the radially inner edges 62 and 64 of the retaining flanges 20 and 22 of about 90% of the radially outer circumference of the rim mounting flanges 73 and 74 is preferable. The elastic nylon belts 56 and 58 in the preferred embodiment have sufficient tensile strength to keep the tire secure to the wheel rim in order to prevent separation due to centrifugal force or side loads thereon.

In the preferred embodiment, 72 of the interrupter webs 40 are spaced equidistant about the circumference of the cavity 36, thus placing such webs at 6 degree intervals thereby forming 72 compartments, generally designated 70, having the opposite angular ends thereof formed by the webs 40 and the radially outer walls thereof formed by the tread wall 68 and the axially opposite walls formed by the side walls 26 and 28 and flanges 20 and 22. With this arrangement, three of such webs 40 are flexed at all times when the rim is loaded.

Figure 2:
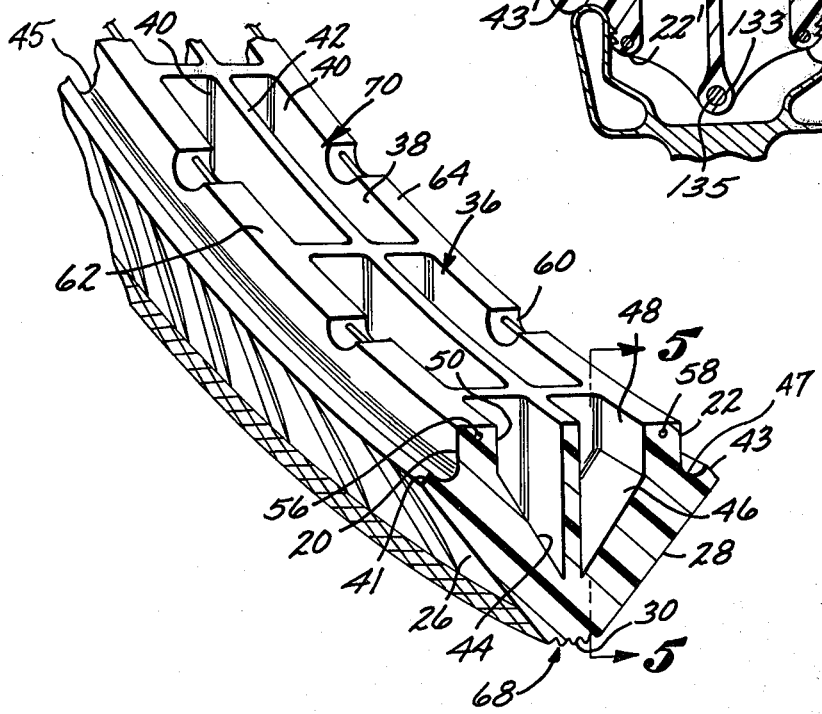
FIG. 2 is a partial cut away perspective view, in enlarged scale, of a portion of the tire shown in FIG. 1.

The tire 10 shown in FIGS. 4 and 5 is essentially the same as that shown in FIG. 1, except that the opposite side walls 26' and 28' are formed to bulge somewhat outwardly as they project axially outwardly and radially inwardly from the tread wall 30'. Lobes 41' and 43' are formed at the radial inner extremities of the respective walls 26' and 28' and the tire then cups to form the radially inwardly facing nesting shoulders 45' and 47'. Gripping ribs 52 and 54 are formed in the axially outer walls of the retaining flanges 20' and 22' for engagement with the respective interior surfaces 76 and 78 of the rim mounting flanges 72 and 74.

In operation, when it is desired to mount the non-pneumatic tire of the present invention on a conventional bicycle rim 12, it is only necessary to remove the conventional pneumatic tire and the tire 10 of the present invention may be stretched onto such rim. Since the tire 10 for a 27 inch rim is only about 24 inches in diameter in its relaxed position, significant stretching thereof is necessary to mount the tire on the rim 12. This can easily be accomplished by positioning the retaining flanges 20 and 22 on one circumferencial side of the tire within the rim flanges 72 and 74 and then threading such tire onto the rim about the remainder of the periphery of such rim while holding the already mounted portion on the rim. This can be accomplished by merely extending a flat tool entirely across the radially outer extremities of the rim flanges 72 and 74 thus stretching the entire tire, including the elastic beads 56 and 58, as the tool is advanced about such rim 12. In this regard, it is important that the belts 56 and 58 have a relaxed circumference significantly less than that for the radially outer extremities of the mounting flanges 72 and 74 to thus cause such elastic belts 56 and 58 to resiliantly hold the flanges 20 and 22 retained interiorly behind the rim mounting flanges 72 and 74. An unstressed circumference of about 90% of this maximum rim flange circumference has been found acceptable for polyurethane having a medium Shore hardness of 65 on the A scale to provide for between 7 and 10% elongation upon stretch for mounting on the rim 12.

Once the tire 10 has been mounted on the rim 12, the supported bicycle is ready to be ridden. As weight is applied to the hub 14 and through the spokes 16 to the rim 12 and, consequently to the tire 10, the weight on such rim will act downwardly thereon and against the respective shoulders 45 and 47 formed by the inner extremities of the side walls 26 and 28. It will be appreciated that the force of such weight will, because of the axially outwardly and radially inward slope of the side walls 26 and 28, tend to bulge the medial portions of such side walls 26 and 28 axially outwardly. Such axial outward flexing of the central portion of such side walls 26 and 28 will be resisted by the tensile strength of the interrupter webs 40 as such webs pass between the rim and supporting surface therefor. Further, since the elastic band 42 is under significant tension, it will serve to hold the medial portions of such webs 40 in the same axial plane as the axially outer extremities thereof, thus preventing buckling or torqueing thereof and consequent axially inward flexing of the retaining flanges 20 and 22 causing them to pull away from the rim mounting flanges 72 and 74.

Experimentation has proven that the interrupter webs 40 perform even greater functions than resisting the tendency of the medial portions of the side walls 26 and 28 to flex outwardly upon loading thereof and in maintaining the mounting flanges 20 and 22 urged outwardly against the mounting flanges 72 and 74 of the rim 10. This important feature, while not being entirely understood, is of great importance in retaining the tire 10 on the rim 12 during operation of such tire at higher speeds. Studies of non-pneumatic bicycle tires and the like have shown that there is a tendency for the loaded tire to squat somewhat as it passes between the rim and supporting surface thus flattening the tread area and forming what is commonly referred to as a footprint. The size of this footprint is directly proportional to the weight being carried on the tire and is increased when the flexibility of the tire is increased. As a result of such squatting of the tire, somewhat of a bulge is created both forwardly and rearwardly of the footprint, which develops a tendency in the tire to separate from the rim, particularly at higher speeds. At lower speeds, the bulges are normally symmetrical forwardly and rearwardly of the footprint but when a torque is being applied to the wheel hub 14 (FIG. 1), the bulge rearwardly of the footprint in the past typically becomes even greater than that forwardly of the footprint, thus increasing the resistance to rolling of the rim and decreasing the efficiency of the tire. The bulge forwardly of the footprint, commonly referred to as a "standing wave", has, in prior art tires frequently resulted in separation of the tire from the rim creating a gap between the tire and rim and, in many instances, resulting in unintentional dismounting of the tire from the rim. This is one of the problems that the tire of the present invention overcomes.

The interrupter webs 40, as they pass between the rim and support surface, serve to interrupt this standing wave eliminating the tendency of the tire to dismount itself at higher speeds. As mentioned hereinabove, the particular phenomenon of the interrupter webs 40 in minimizing, or even eliminating, such standing wave is not fully understood, but it is believed that the axial resistance provided by such webs to axially outward squatting of the side walls 26 and 28 serve to interrupt the tendency of the resilient polyurethane to flow along the rim forwardly and rearwardly of the footprint, thus preventing a buildup of the standing wave and consequent walking of the tire around the rim.

Referring to FIG. 4, it will be appreciated that the elastic annular band 42 serves to tie the central portions of the interrupter webs 40 together and cooperates with the side walls 26' and 28' to form what may be referred to as individual torsion boxes which provide yielding support for the rim 12. The annular band 42, when weight is applied directly over the hub 14, has its longer cross sectional dimension disposed centrally beneath such weight to cooperate with the side walls 26' and 28' and webs 40, in yieldingly resisting radially inwardly flexing of the tread wall 68'.

During cornering, when a lateral force L (FIG. 4), is applied to the tread surface 30' relative to the rim 12, the side walls 26' and 28' will be flexed causing the elastic band 42 to bend out of the vertical plane 80 of the rim 12, thus allowing the compressive force C to bend the annular dimension of such band 42 even farther, thus reducing the distance between such lateral force L and the bead 58' on the outside of the corner being turned. This reduces the lever arm between such lateral force L and the elastic bead 58', thus reducing the force tending to stretch such bead 58' and lessens the tendency to expand such bead to a point where it may exceed the diameter of the outside rim mounting flange 74, and freeing the retaining flange 22 to escape from the interior of such mounting flange 74. It will be appreciated that this tendency of the tire to squat depends on the flexibility of the material from which such tire is constructed.

Figure 6:
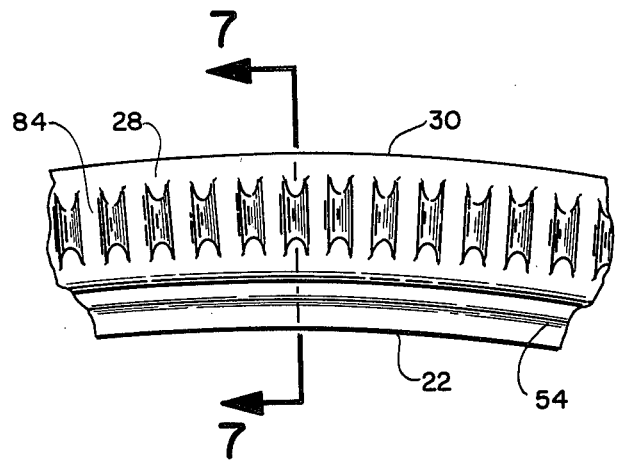
FIG. 6 is a partial side view of a second embodiment of the non-pneumatic tire of the present invention.
Figure 7:
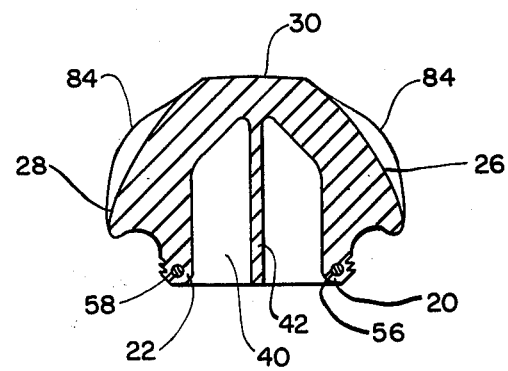
FIG. 7 is a transverse sectional view taken along the line 7—7 of FIG. 6.

The non-pneumatic tire shown in FIG. 6 is similar in construction to the tire shown in FIGS. 1 through 5, except that it incorporates exterior traction ribs 84 (FIG. 7) that not only act to resist collapse of the side walls 26 and 28 when weight is applied thereto, but provide the additional feature of enhancing the traction of the tire when operating in a soft terraine or during cornering thereof. It will be appreciated that the webs 84 which are on an axial plane, bulge outwardly away from the outwardly and radially inwardly sloping side walls 26 and 28 to thus provide somewhat of a beam like construction resisting collapse of such wall as weight is applied thereto.

Figure 8:
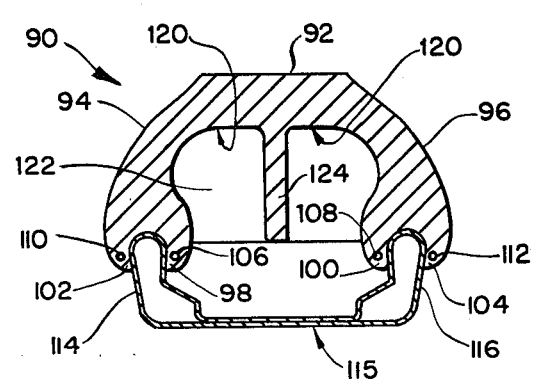
FIG. 8 is a transverse sectional view of a third embodiment of the non-pneumatic tire of the present invention; and, FIG. 9 is a transverse sectional view of a fourth embodiment of the non-pneumatic tire of the present invention.

The non-pneumatic tire 90 shown in FIG. 8 is also similar to tire shown in FIGS. 1 through 5 except that it is somewhat of a lower profile having a shorter distance between the rim and tread surface 92 and provides for interior and exterior gripping of the mounting flanges 114 and 166 of the bicycle tire rim 115. The tire 90 includes a radially outwardly disposed circumferential tread wall 92 and is formed with radially inwardly and axially outwardly curved side walls 94 which terminate at their axially inward extremities in respective axially inwardly facing central grooves which fit over the exterior edges of the mounting flanges 114 and 116 and define respective anterior and exterior retaining flanges 98, 100, 102 and 104. Also, interior and exterior elastic belts 106, 108, 110 and 112 are embedded within the respective retaining flanges for resisting expansion of such tire and possible dismounting from the rim. The interrupter webs 122 are comparable to the webs 40 and the annular elastic support band 124 is comparable to the support band 42 shown in FIG. 4.

Consequently, the tire shown in FIG. 8 is similar to the tire shown in FIGS. 1 through 5 except that it is somewhat lower profile and provides for interior and exterior retaining flanges and elastic beads.

Figure 9:
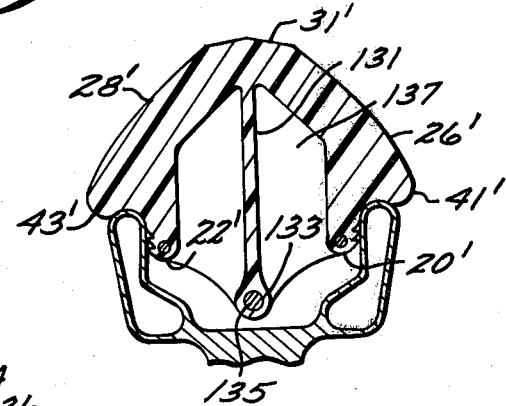

The tire shown in FIG. 9 is similar to the tire shown in FIG. 4 except that it includes a central radial band 131 projecting radially inwardly beyond the radial inner extremities of the side flanges 20' and 22', and is enlarged in cross-section on its radial inner extremity to form a circular conduit 133 having a rigid metallic bead 135 telescoped therethrough. Interrupter webs 137 are spaced equidistant about the circumference of the tire and taper axially downwardly and inwardly from the flanges 20' and 22', to join with the radial inner extremity of the band 131.

From the foregoing, it will be apparent that the non-pneumatic tire of the present invention is of hollow construction, thus minimizing the use of petroleum base from which it may be constructed and provides for performance comparable to a pneumatic tire while relieving the problems normally connected with the prior art non-pneumatic tires as related to accidental dismounting thereof and with respect to resistance to rolling.

I claim:

1. A non-pneumatic tire of the type to be mounted on a rim formed with an axially extending central rim and axially spaced apart annular mounting flanges comprising:

a resilient circumferential tread wall having a radially outwardly facing tread surface;

a pair of axially spaced apart resilient elastic side walls projecting radially inwardly from said tread wall and cooperating therewith to form a circumferential cavity, said sidewalls terminating at their radial inner edges in shoulders for seating on the radial edges of said mounting flanges;

a pair of axially spaced apart elastic retaining flanges projecting radially inwardly from said respective sidewalls for being stretched over said rim mounting flanges and for receipt against the axially inner sides thereof, said retaining flanges terminating in radial inner edges spaced radially from axially extending surfaces of said rim;

a plurality of radially projecting resilient webs spaced apart substantially equidistant about the circumference of said cavity, extending axially between said retaining flanges and said side walls and attached thereto throughout substantially the radial width of said retaining flanges and said side walls to yieldingly urge said retaining flanges axially outwardly into engagement with said respective mounting flanges; and, a single annular elastic stabilizing band disposed in said cavity, centrally between said sidewalls and of a circumference sufficient to be held under tension when said tire retaining flanges are mounted on said rim mounting flanges whereby said tire may be mounted on said rim with said retaining flanges retained between said mounting flanges and pushed thereagainst by said webs and when weight is applied to said rim while said tire rolls on a support surface said sidewalls will carry said weight and when said webs pass sequentially between said rim and support surface they will cooperate with said sidewalls to provide irregular support.

2. An airless tire as set forth in claim 1 wherein:
   said tire walls, webs and bands are constructed of polyurethane.

3. A non-pneumatic tire as set forth in claim 1 wherein:
   said retaining flanges are formed with a relaxed circumference of about 90% of the radially outer edges of said mounting flanges.

4. A non-pneumatic tire as set forth in claim 1 wherein:
   said sidewalls diverge radially inwardly and axially outwardly from said treadwall and cooperate therewith in forming a V-shaped cross-section.

5. A non-pneumatic tire as set forth in claim 1 that includes:
   endless beads imbedded in said retained flanges and having less elasticity than said retained flanges for cooperating with said webs and flanges in holding said tire on said rim.

6. A pneumatic tire as set forth in claim 1 of a predetermined diameter for carrying a predetermined load and wherein:
   said webs are spaced radially apart a distance sufficient to, when said rim is loaded with said predetermined load, cause no more than three of said webs to be loaded at one time.

7. A non-pneumatic tire set forth in claim 1 wherein:
   said webs are spaced apart an angular distance of about 6°.

* * * * *